Patented Sept. 19, 1939

2,173,128

UNITED STATES PATENT OFFICE 2,173,128

PROCESS FOR IMPROVING THE COLOR OF OFF-COLOR CADMIUM RED PIGMENTS

James J. O'Brien, Baltimore, Md., assignor to The Glidden Company, Cleveland, Ohio, a corporation of Ohio No Drawing. Application December 17, 1937, Serial No. 180,451

10 Claims. (Cl. 134—58)

The present invention relates to an improvement in the production of cadmium red pigments and more specifically it relates to the method whereby off-color cadmium red pigments of the cadmium sulfo-selenide type can be restored to a standard color.

Cadmium sulfo-selenide is frequently made by precepitating a cadmium sulfate solution with a barium or sodium sulfide solution containing dissolved selenium, to produce a cadmium sulfo-selenide. This precipitate is of a dirty brown color and in order to develop the bright red color of the pigment it is necessary to calcine the precipitate. This calcination must be properly carried out and it frequently happens that off-color pigment results. It is not known to what this off-color is due but it is partly due to cadmium oxide. It is also true that it is partly due to under-calcination. Assuming the off-color to be due to cadmium oxide it is logical to assume that if the pigment were calcined in the presence of excess barium or sodium sulfide that the sulfide would change the cadmium oxide to sulfide. But this is not the case, and instead of brightening the colors the presence of even a small amount of barium sulfide has a chalking effect on the pigment.

It has also been found that if an attempt is made to calcine the off-color pigment as is that the color is darkened rather than brightened and that weak tinting strength results due to over-calcination. The attempt has also been made to recover the off-color pigment by mixing with a finished cadmium red pigment of standard color but this has not proved satisfactory since the off-color material even when used in small amounts interferes with the color of the standard pigment the effect being one of mere dilution with the off-color material. The addition of as little as 100 pounds of off-color material to a ton of pigment of standard color will detract from the color of the standard material.

It is therefore an object of this invention to provide a process whereby off-color cadmium sulfo-selenide pigments can be utilized without detraction in the color of the final pigment.

Another object of the invention is to provide a process whereby the color of off-color cadmium sulfo-selenide pigment can be restored.

Other objects will be apparent to those skilled in the art from the following description of the invention.

It has been found that if the off-color pigment particles are coated with a precipitate of the cadmium sulfo-selenide prepared in the usual manner by striking cadmium sulfate and a barium or sodium sulfide solution containing dissolved selenium, that the color of the resulting pigment after calcination is as good as that of the standard pigment made without any off-color material. It is believed that this result is due to the fact that the protective film of the freshly precipitated cadmium sulfo-selenide precipitate prevents over-exposure of the off-color pigment particles to heat and oxygen during the calcination.

The following procedures are illustrative of the invention.

Example I 188 gallons of 35° Baumé cadmium sulfate solution was reacted with 415 gallons of 17° Baumé barium sulfo-selenide solution, these amounts being sufficient to produce 1000 pounds of pigment. 600 pounds of off-color cadmium sulfo-selenide lithopone pigment (Cd SSe+BaSO$_4$) was then added dry and the batch heated to a temperature of 150° F. for half an hour. After filtering and washing the crude pigment was dried and calcined at a temperature between 500 and 700° C. 1600 pounds of pigment containing 37.5% of off-color material was produced which was of the same color as the standard containing no off-color material, and which had a tinting strength equal to the standard.

Example II

Instead of adding the dry off-color pigment to the strike as in Example I, 600 pounds of the off-color material was first slurried in water and the cadmium sulfo-selenide was then precipitated in the off-color pigment, the amounts and concentrations of barium sulfo-selenide and cadmium sulfate solutions being the same as in Example I. The color and tinting strength of the resulting pigment were equal to those in Example I. Due, however, to the fact that less volume is required by the procedure of Example I it is preferred.

It is thus seen that the color of the finished pigment is not reduced by the addition of the off-color pigment but also that large amounts of the off-color material may be employed in accordance with the present invention. By this process expensive material is recovered which would otherwise be lost, or used in the production of inferior pigments.

It is to be understood that various changes and modifications apparent to those skilled in the art may be made without departing from the spirit of the invention. Instead of employing a distended pigment, the pure cadmium sulfo-selenide may be used or mixtures of the pure and distended materials may be used. Thus the off-color material may be distended with the barium sulfate and the fresh precipitate may be the pure cadmium sulfo-selenide.

I claim:

1. The process of improving the color of off-color cadmium sulfo-selenide pigment which comprises coating the particles of the off-color nide pigment and freshly prepared cadmium sulfo-selenide precipitate, and calcining the mixture.

2. The process of improving the color of off-color cadmium sulfo-selenide pigment which comprises coating the particles of the off-color pigment with a freshly prepared cadmium sulfo-selenide precipitate, and then calcining.

3. The process of improving the color of off-color cadmium sulfo-selenide pigment which comprises mixing off-color cadmium sulfo-selenide pigment and freshly prepared cadmium sulfo-selenide precipitate, the amount of off-color material being up to 37.5% of the total mixture, and calcining the mixture.

4. The process of claim 1 in which the calcination temperatures are from 500 to 700° C.

5. The process for improving the color of off-color cadmium sulfo-selenide pigment which comprises mixing off-color cadmium sulfo-selenide pigment with freshly precipitated cadmium sulfo-selenide-barium sulfate precipitate and calcining the mixture.

6. The process for improving the color of off-color cadmium sulfo-selenide pigment which comprises mixing off-color cadmium sulfo-selenide-barium sulfate pigment with freshly precipitated cadmium sulfo-selenide-barium sulfate precipitate, and calcining the mixture.

7. The process for improving the color of off-color cadmium sulfo-selenide pigment which comprises striking cadmium sulfate solution with a barium sulfo-selenide solution adding to the strike off-color cadmium sulfo-selenide pigment and calcining the crude pigment.

8. The process of claim 7 in which the off-color material is added dry.

9. The process for improving the color of off-color cadmium sulfo-selenide pigment which comprises preparing an aqueous slurry of off-color cadmium sulfo-selenide pigment precipitating a cadmium sulfo-selenide precipitate on the off-color pigment to produce a crude pigment and calcining the crude pigment.

10. The process for improving the color of off-color cadmium sulfo-selenide pigment which comprises striking cadmium sulfate solution with a barium sulfo-selenide solution, adding to the strike off-color cadmium sulfo-selenide pigment, heating the mixture at approximately 150° F. for half an hour and then filtering, washing and calcining the crude pigment.

JAMES J. O'BRIEN.

CERTIFICATE OF CORRECTION.

Patent No. 2,173,128. September 19, 1939.

JAMES J. O'BRIEN.

It is hereby certified that error appears in the printed specification of the above numbered patent requiring correction as follows: Page 2, first column, lines 12 and 13, claim 1, strike out the words and syllable "coating the particles of the off-color nide" and insert instead mixing off-color cadmium sulfo-selenide; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.